UNITED STATES PATENT OFFICE.

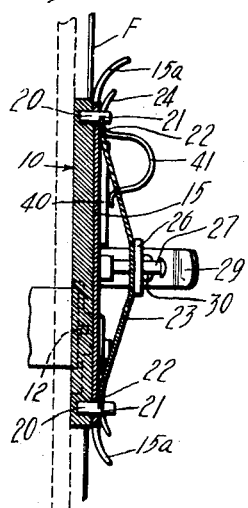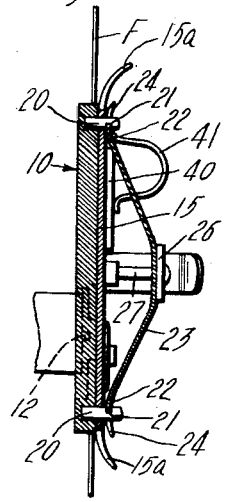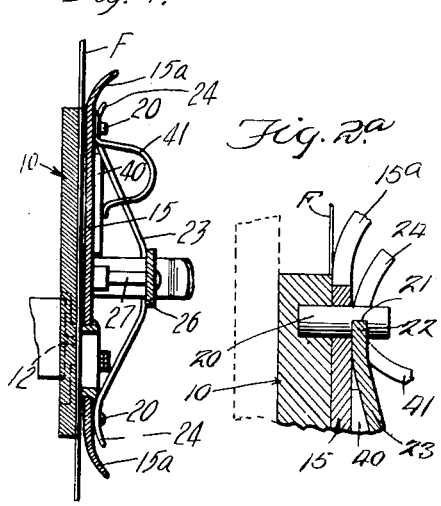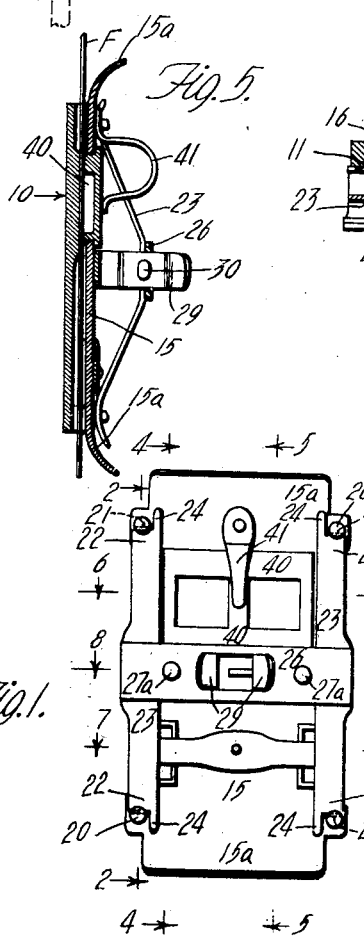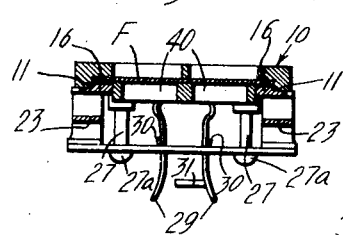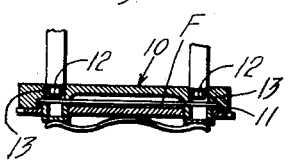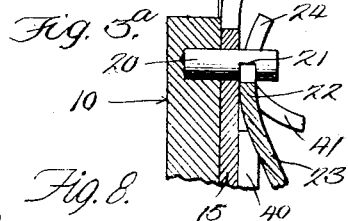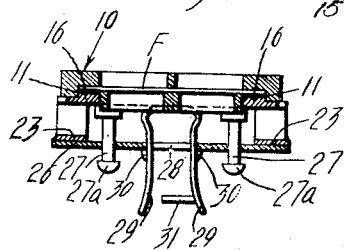

LLOYD BROWN, OF LOS ANGELES, CALIFORNIA, ASSIGNOR TO SILENT DRAMA SYNDICATE, A TRUSTEESHIP; LLOYD BROWN AND ALEXANDER GRAYDON, TRUSTEES.

FILM GATE FOR KINETOGRAPH MECHANISM.

1,404,707.         Specification of Letters Patent.     Patented Jan. 24, 1922.

Application filed November 24, 1919. Serial No. 340,143.

*To all whom it may concern:*

Be it known that I, LLOYD BROWN, a citizen of the United States, residing at Los Angeles, in the county of Los Angeles, State of California, have invented new and useful Improvements in Film Gates for Kinetograph Mechanism, of which the following is a specification.

This invention relates to film gates and film gate constructions for motion picture machines, either cameras or projectors; and the object of the invention is generally and broadly to provide a gate construction simple and efficient, easily operated, easily removed from the film carrying plate, and preferably one which, in order to satisfy these objects, is entirely and freely removable from the film carrying plate.

Film gates which have been in common and usual use in the art have heretofore ordinarily been hinged to the film carrying plate. Adjacent mechanism of the kinetograph usually prevents these hinged gates from being thrown around any further than approximately an angle of 90°; with the result that when such a film gate is opened, it stands in a position projecting directly outwardly from the film plate and is consequently very much in the way of the operator. Even where such hinged gates are provided with hinges having a removable pin, the gates are not easily and quickly removable, and their removal in any case tends to displace the film from its proper position on the film plate, because it is not practicable to remove such gates from their plates by true rectilinear motion perpendicular to the base of the plate.

It is generally on object of this invention to provide a film gate construction overcoming the objectionable features of the former type of film gates. To this end, and to satisfy other objects which will appear more clearly from the following specific description, I have made certain improvements in film gates, of which the following described film gate is typical. It will be understood that the specific form of film gate set forth in the following description does not specify the limits of my invention, but rather merely typifies the invention; and from this specific description the invention itself, as well as the detailed construction of a preferred form of film gate, will be readily understood. For the purpose of this specific detailed description I refer to the accompanying drawing in which—

Fig. 1 is a face elevation of the film gate mounted upon a film carrying plate; Fig. 2 is a vertical section taken as indicated by line 2—2 on Fig. 1, showing the parts in their locked position; Fig. 2ª is an enlarged detail view of the parts in Fig. 2 shown in locked position; Fig. 3 is a similar view showing the parts in their unlocked position; Fig. 3ª is an enlarged detail of the parts shown in Fig. 3, showing these parts in unlocked position; Fig. 4 is a section on line 4—4 of Fig. 1, showing the parts in their unlocked position; Fig. 5 is a vertical section on line 5—5 on Fig. 1, showing the parts in their unlocked position; Fig. 6 is a horizontal cross-section on line 6—6 of Fig. 1, showing the parts in their unlocked position; Fig. 7 is a horizontal cross-section on line 7—7 of Fig. 1; and Fig. 8 is a horizontal cross-section taken on line 8—8 of Fig. 1.

In the drawings the numeral 10 may designate a film carrying plate. This film plate 10 may be of any ordinary construction and adapted to carry a film F. The film is shown as running between longitudinal side shoulders 11 on the film plate. The film plate which I illustrate here happens to be a double aperture plate; but that is immaterial so far as the present invention is concerned. Claws 12 pass through the plate 10 through slots 13 in the plate to engage the film F.

The film F is held back against the film carrying plate by a film gate whose body is formed by the gate plate 15. This gate plate 15 is turned outwardly at its upper and lower ends as indicated at 15ª. The gate plate has an inward extension at 16 (see particularly Figures 6 and 8) which presents longitudinal shoulders engaging the longitudinal side shoulders 11 of the film carrying plate. The film is not pressed against by the gate plate itself, being only loosely confined between the two plates 10 and 15. Air aperture block 40 is set in plate 15 and is pressed by a spring 41 against the film F, and the film is thus confined against the plate 10.

Mounted on and projecting from the base of the film carrying plate 10 I provide gate mounting studs 20 preferably four in number and arranged in two pairs, the studs of each pair being spaced from each other longitudinally of the film carrying plate, and the pairs of studs being located at opposite edges of the film carrying plate. These studs are provided with notches 21 in their opposing faces, and the ends 22 of spring bows 23 are adapted to enter into these notches. There are preferably two of these spring bows 23. Their central portions bow away from the plate 15; and at their ends they are provided with curved extensions 24 which bear upon the surface of plate 15, alongside the studs 20. Plate 15 is provided with four holes to fit over the studs 20, and when the plate is in proper position to confine the film F on plate 10, then the notches 21 are in such position relative to plate 15 that the ends of the bows 23 may enter those notches. The bows normally stand, due to their own resiliency, in the position shown in Figs. 3, 4 and 6. And when it is desired to lock the gates on plate 10, then the central part of the bows are pushed inwardly toward the gate to the position shown in Figs. 2 and 8. The central parts of the bows are connected by a cross-piece 26. This cross-piece 26 moves on and is guided by a pair of studs 27 projecting from the gate plate 15; and outward spring pressed movement of the cross piece 26, and of the central parts of the bows 23, is limited by the heads 27ª of the studs 27. In this outer position, the ends of the bows are withdrawn from the stud notches as is clearly shown in Fig. 3, and in this outer position the spring of the bows is not fully relaxed, so that the ends of the bows are still pressed against the plate 15 in proper position to enter notches 21. Cross-piece 26 has a central opening 28, and a pair of spring clips 29 extends through this opening. These spring clips have on their exterior surfaces projections 30 of the form shown, having square inner edges and sloping outer surfaces. Spring clips 29 tend to expand outwardly from each other, so that when the cross piece 26 is pressed inwardly, the projections 30 will spring outwardly over the cross-piece and then keep it from outward movement. This condition is shown in Fig. 8, and in Fig. 2. In order to release the gate from the film carrying plate it is only necessary to compress the clips 29, which causes release of the cross piece 26 and allows the bows 23 to spring outwardly to the position shown in Fig. 3, removing their ends from the stud notches 21. One of the spring clips 29 carries a stop pin 31 to prevent the spring clips from being compressed too much. Projections 30 may be made by pressing or stamping out the sheet spring metal of clips 29.

When the parts are in the position shown in Figs. 3 and 6, then the gate may be removed from the film carrying plate 10 by simple straight outward movement. The pins 20 then form guides to guide the gate in its movement off the film carrying plate, guiding the gate in a movement at right angles to the face of the film carrying plate. The gate may thus be removed from the film carrying plate without any tendency whatever to disturb the position of the film thereon; and, furthermore, this method of removing the film gate allows the shoulders at 11 on the film carrying plate, and the corresponding shoulders on the gate plate 15, to be made square and to fit accurately.

The spring clips 29 form the handle by which the gate is handled in taking it off the plate 10. To remove the gate, it is only necessary to compress the clips 29 and then pull outwardly upon them. To place the gate upon the plate 10 it is only necessary to place the gate upon studs 20 and then press inwardly upon the cross piece 26, the two ends of the cross piece being held between the fingers. The first inward motion will move the plate 15 to its proper position on the studs and subsequent inward motion then presses the cross piece 26 to the position shown in Figs. 2 and 8.

Having described a preferred form of my invention, I claim:

1. In kinetographic apparatus, a film carrying plate, a film confining gate mounted on said plate, and gate guiding means connecting said plate and said gate to permit complete release of the gate in a direction away from said plate, said connection preventing any movement of said gate transverse to said plate and the film carried thereby.

2. In kinetographic apparatus, a film carrying plate, a film confining gate mounted on said plate, and gate guiding means carried by said plate and so disposed as to permit complete release of the gate in a direction away from said plate, said connection preventing any movement of said gate transverse to said plate and the film carried thereby.

3. In a kinetographic apparatus, a film carrying plate, a film confining gate mounted on said plate, and a plurality of gate guiding studs connecting said plate and said gate to permit complete release of the gate in a direction away from said plate, said connection preventing any movement of said gate transverse to said plate and the film carried thereby.

4. In a kinetographic apparatus, a film carrying plate, a film confining gate mounted on said plate, and a plurality of gate guiding studs carried by said plate and extending at right angles therefrom, said studs connecting said plate and said gate to permit complete release of the gate in a direction away from said plate, said connection preventing any movement of said gate transverse to said plate and the film carried thereby.

5. In kinetographic apparatus, a film carrying plate, guide members mounted thereon extending substantially at right angles to the plate, and a film confining gate mounted on and guided by the guide members in a movement substantially rectilinear and substantially at right angles to the plate and entirely releasable from said guide members by outward movement away from the plate.

6. In kinematographic apparatus, a film carrying plate; and a film confining gate mounted on the plate and entirely releasable therefrom by rectilinear movement normal to the face of the plate.

7. In kinetographic apparatus, a film carrying plate, a film confining gate mounted on said plate, and a plurality of gate guiding studs connecting said plate and said gate to permit complete release of the gate in a direction away from said plate, said connection preventing any movement of said gate transverse to said plate and the film carried thereby, and manually operable means to lock said gate on said studs.

8. In kinematographic apparatus, a film carrying plate; studs mounted on and projecting from one face of the plate, said studs having notches near their ends, a film confining gate mounted on the studs, and means carried by the gate and adapted to enter the stud notches to lock the gate in place.

9. In kinematographic apparatus, a film carrying plate; studs mounted on and projecting from one face of the plate, said studs having notches near their ends, a film confining gate mounted on the studs, spring means carried by the gate and adapted to enter the stud notches, and manually releasable means to hold the spring means in engagement with the stud notches.

10. In kinematographic apparatus, a film carrying plate; a pair of notched studs mounted on and projecting from a face of the plate, a film confining gate mounted on the studs, and means mounted on the gate and expansible between the studs to enter their notches.

11. In kinematographic apparatus, a film carrying plate; a pair of notched studs mounted on and projecting from a face of the plate, a film confining gate mounted on the studs, and means mounted on the gate and expansible between the studs to enter their notches, said means embodying a resilient member expansible by change of form.

12. In kinematographic apparatus, a film carrying plate; a pair of notched studs mounted on and projecting from a face of the plate, a film confining gate mounted on the studs, and means mounted on the gate and expansible between the studs to enter their notches, said means embodying a resilient bowed member extending between the studs and whose ends are adapted to enter the stud notches.

13. In kinematographic apparatus, a film carrying plate; a pair of notched studs mounted on and projecting from a face of the plate, a film confining gate mounted on the studs, means mounted on the gate and expansible between the studs to enter their notches, said means embodying a resilient bowed member extending between the studs and whose ends are adapted to enter the stud notches; and manually operatable and releasable means to decrease the amount of bowing of said member and to lock the member in its position of less bow, the member tending resiliently to return to its position of larger bow.

14. In kinematographic apparatus, a film carrying plate; a pair of notched studs mounted on and projecting from a face of the plate, a film confining gate mounted on the studs, a spring bow extending across the gate, bowing outwardly from the face of the gate, and its ends adapted to enter the stud notches, and a spring catch adapted to catch and hold the central part of the bow toward the gate.

15. In kinematographic apparatus, a film carrying plate; two pairs of spaced studs mounted on and projecting from a face of the plate, a film confining gate mounted on the studs, said studs having notches, two spring bows one for each pair of studs and the ends of each bow adapted to enter the stud notches, the spring bows bowing away from the gate in their central portions and standing normally in a position with their ends near the studs, a cross piece connecting the central parts of the bows, guides for holding the bows and cross piece in position relative to the gate, and a manually releasable spring catch acting on the cross piece to hold it and the bows toward the gate.

16. In kinetographic apparatus, a film carrying plate having film guiding means on one face, a film confining gate mounted on said plate and entirely releasable therefrom, and guiding members mounted on said plate at opposite sides thereof and extending outwardly from the face of said plate.

17. In kinetographic apparatus, a film carrying plate having film guiding means on one face, a film confining gate mounted on said plate and entirely releasable therefrom, and gate guiding members mounted on said plate at opposite sides thereof and extending therefrom at right angles to compel releasing movement of the gate in a substantially rectilinear path and substantially at right angles to the plate.

In witness that I claim the foregoing I have hereunto subscribed my name this 12th day of November, 1912.

LLOYD BROWN.

Witness:
VIRGINIA BERINGER.